United States Patent
Suzuki (10) Patent No.: US 7,984,218 B2
(45) Date of Patent: Jul. 19, 2011

(54) PROCESSOR, ELECTRONIC APPARATUS, INTERRUPTION CONTROL METHOD AND INTERRUPTION CONTROL PROGRAM

(75) Inventor: Kumiko Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 72 days.

(21) Appl. No.: 12/358,831

(22) Filed: Jan. 23, 2009

(65) Prior Publication Data

US 2009/0198850 A1    Aug. 6, 2009

(30) Foreign Application Priority Data

Feb. 5, 2008  (JP) .................................. 2008-025616

(51) Int. Cl.
*G06F 13/24*    (2006.01)
*G06F 9/26*     (2006.01)

(52) U.S. Cl. ........ 710/267; 710/260; 710/266; 710/268; 711/204; 718/100

(58) Field of Classification Search .................. 710/264, 710/265, 267, 266, 268, 269; 711/204; 718/100
See application file for complete search history.

(56) References Cited

U.S. PATENT DOCUMENTS

| | | | | |
|---|---|---|---|---|
| 4,959,781 A | * | 9/1990 | Rubinstein et al. | 710/262 |
| 5,283,904 A | * | 2/1994 | Carson et al. | 710/266 |
| 5,381,541 A | * | 1/1995 | Begun et al. | 710/269 |
| 5,410,710 A | * | 4/1995 | Sarangdhar et al. | 710/266 |
| 5,428,799 A | * | 6/1995 | Woods et al. | 710/266 |
| 5,832,279 A | * | 11/1998 | Rostoker et al. | 710/266 |
| 6,430,643 B1 | * | 8/2002 | Arndt | 710/263 |
| 6,711,643 B2 | * | 3/2004 | Park et al. | 710/260 |
| 7,581,052 B1 | * | 8/2009 | Solomita | 710/267 |
| 7,702,835 B2 | * | 4/2010 | Riethmuller | 710/260 |
| 7,721,035 B2 | * | 5/2010 | Utsumi | 710/268 |
| 2006/0174246 A1 | * | 8/2006 | Tamura et al. | 718/100 |
| 2009/0172423 A1 | * | 7/2009 | Song et al. | 713/300 |

FOREIGN PATENT DOCUMENTS

JP         1992033130 A         2/1992

* cited by examiner

*Primary Examiner* — Brian T Misiura (57) ABSTRACT

A processor 1 provided with a plurality of cores, an interrupt operation dedicated core 20 which is used only for an interrupt operation; a normal core 11 to 1*n* which outputs an interrupt request when an interrupt source is generated; and an interrupt control part 30 which, upon receipt of the interrupt request, assigns an operation by an interrupt vector to the interrupt operation dedicated core 20.

10 Claims, 6 Drawing Sheets

FIG. 6  PRIOR ART

PROCESSOR, ELECTRONIC APPARATUS, INTERRUPTION CONTROL METHOD AND INTERRUPTION CONTROL PROGRAM

This application is based upon and claims the benefit of priority from Japanese patent application No. 2008-025616, filed on Feb. 5, 2008, the disclosure of which is incorporated herein in its entirety by reference.

TECHNICAL FIELD

The invention relates to a processor with a plurality of cores being mounted, an electronic apparatus provided with this processor, an interrupt control method showing interrupt procedures in a processor, and an interrupt control program for executing this interrupt control method.

BACKGROUND ART

In a conventional microprocessor (MPU; Micro Processing Unit, hereinafter simply referred to as a "processor"), a set of processor core (CPU; Central Processing Unit, hereinafter simply referred to as "core") formed of an instruction issuing unit or a functional unit is mounted in a package. Recently, microprocessors have entered an era of the so-called "multi-core" or "many-core", in which a plurality of cores which are independent from each other are mounted in a single package.

This technology is expected to be further developed in the future, and, as a result, it is believed that processors in which many cores are mounted will be developed and cores will find a variety of applications.

In a computer system in which a processor is mounted, an operation called an "interrupt" is executed.

An interrupt means making an interrupt request during program execution. Specifically, an interrupt means suspension of the program execution and execution of an interrupt operation program (interrupt handler).

Figure 5:
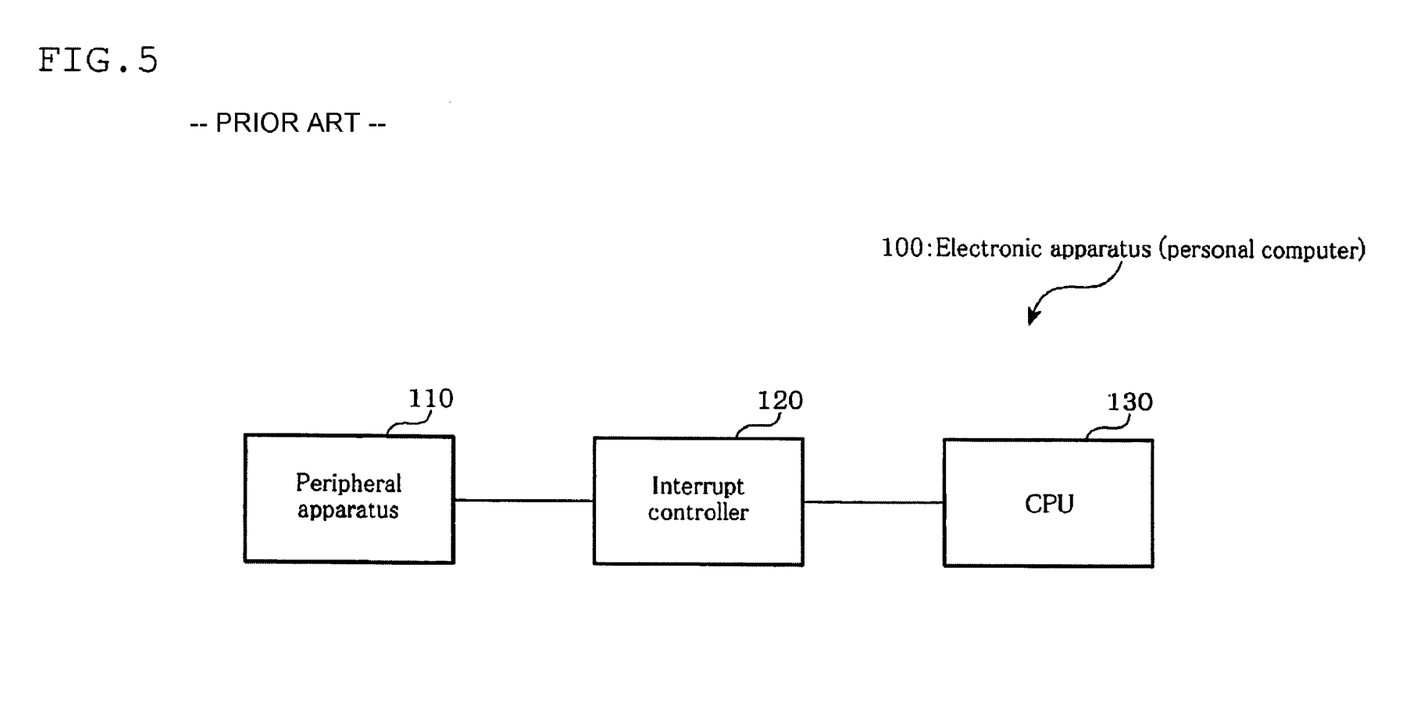
FIG. 5 is a block diagram showing the connection relationship between the peripheral apparatuses, the interrupt controller and the CPU.
Figure 6:
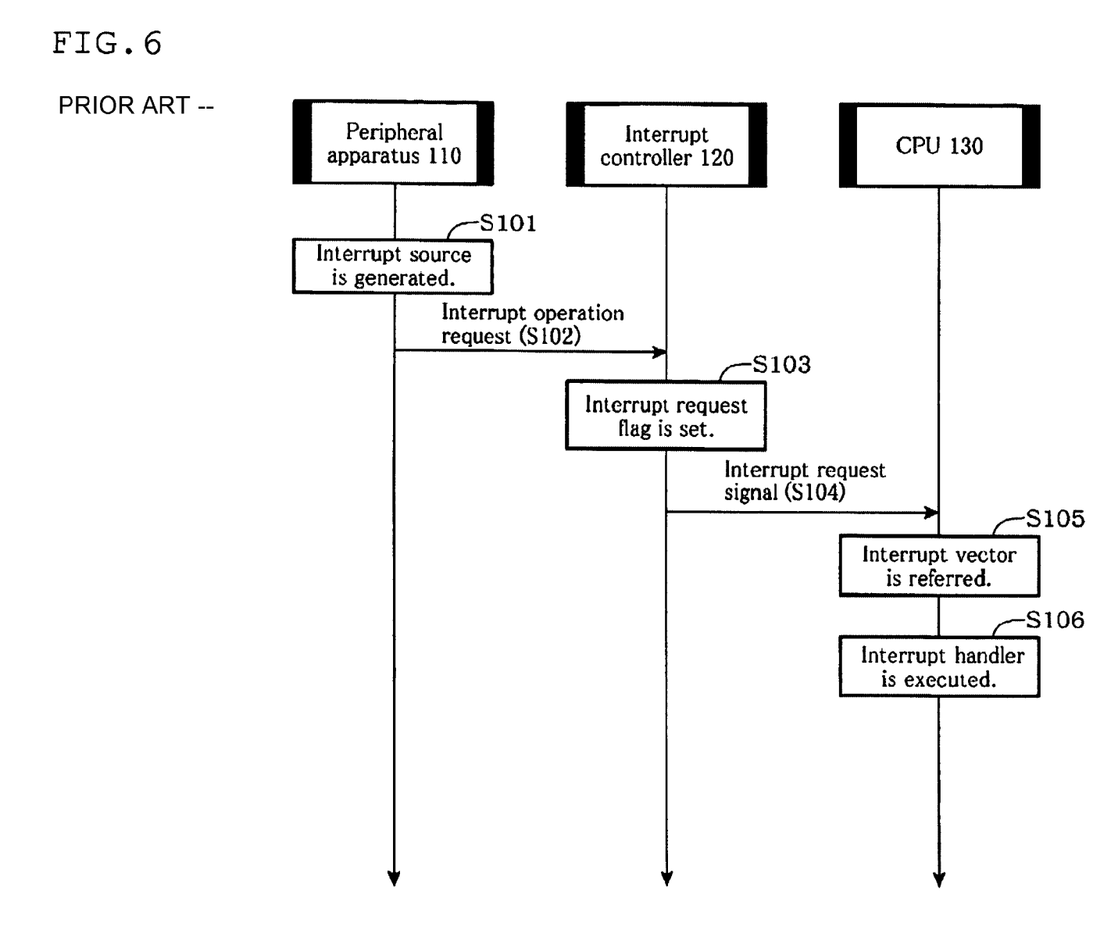
FIG. 6 is a diagram showing the flow of the operation shown in FIG. 5.

General operation procedures of this interrupt operation will be explained with reference to FIGS. 5 and 6. FIG. 5 is a block diagram showing an example of a hardware configuration (configuration of a control system in an electronic apparatus (personal computer)) and FIG. 6 is a view showing the procedures of an interrupt operation.

A peripheral apparatus 110 such as a keyboard and a mouse sends an interrupt request to an interrupt controller 120 (Step 102) when an interrupt source is generated (Step 101). Upon receipt of the interrupt request, an interrupt controller 120 sets an interrupt request flag (Step 103). Here, the interrupt controller 120 performs determination of the priority of interrupts for which the flag has been set, masking (determination by a mask register on the validity or the invalidity of the mask) or the like. For unmasked interrupts, an interrupt request signal is sent to a CPU 130 in the order of priority (Step 104).

Upon receipt of the interrupt request signal from the interrupt controller 120, the CPU 130 refers to an interrupt vector by using an interrupt number of the interrupt request signal (Step 105), and the control is transferred to an address written in this interrupt vector, thereby executing an interrupt handler (Step 106).

As mentioned above, in a computer operation, if an interrupt is generated, an interrupt operation is performed by an interrupt vector in such a manner that an on-going operation is suspended.

However, if an interrupt operation is generated, a problem occurs that the operation time is prolonged due to the suspension of the operation. In addition, the cache contents may be rewritten by the interrupt operation, causing the operation speed to be lowered after the normal operation is restored.

Under such circumstances, a technology has been proposed in which an interrupt is performed without lowering the operation speed (see Patent Document 1, for example).

For example, in such a technology, a computer is provided with an operating system (OS), a CPU used only for a normal task operation (normal operation CPU), a CPU used only for an interrupt task operation (interrupt operation CPU) and a memory. When an interrupt occurs during the execution of a normal task by the normal operation CPU, the OS assigns the interrupt CPU according to the interrupt source, allowing the interrupt operation to be executed.

Due to such a configuration, since responding to the interrupt operation only requires a time for assigning an interrupt operation CPU, no time is required for the saving of a program counter or a register, whereby the interrupt operation can be performed more quickly.

Patent Document 1: JP-A-04-033130

SUMMARY

In the technology disclosed in Patent Document 1, however, the assignment of the interrupt operation CPU is performed by an OS.

In the region of a server, an OS is owned by each hardware and software vendor. Therefore, for a server vendor which does not develop an OS, it is difficult to change an OS. In light of the above, the technology disclosed in Patent Document 1 was not made in view of actual circumstances, and hence, is not realistic and practical.

The invention has been made in view of the above-mentioned circumstances, and an exemplary object thereof is to provide a processor, an electronic apparatus, an interrupt control method and an interrupt control program which are capable of increasing the speed of an interrupt operation without depending on an OS.

In order to attain the object, the processor of the invention is provided with a plurality of cores, which includes:

an interrupt operation dedicated core which is used only for an interrupt operation;

a normal core which outputs an interrupt request when an interrupt source is generated; and an interrupt control part which, upon receipt of the interrupt request, assigns an operation by an interrupt vector to the interrupt operation dedicated core.

The electronic apparatus of the invention is provided with one or two or more processors, wherein the processor includes:

an interrupt operation dedicated core which is used only for an interrupt operation;

a normal core which outputs an interrupt request when an interrupt source is generated; and an interrupt control part which, upon receipt of the interrupt request, assigns an operation by an interrupt vector to the interrupt operation dedicated core.

The interrupt control method of the invention includes an operation of receiving an interrupt request and an operation of assigning an operation by the interrupt vector to an interrupt operation dedicated core which is used only for an interrupt operation.

The interrupt control program of the invention, wherein an operation of receiving an interrupt request and an operation of assigning an operation by the interrupt vector to an interrupt operation dedicated core which is used only for an interrupt operation are allowed to be executed by an interrupt control part.

EXEMPLARY EMBODIMENT

Exemplary embodiments of the processor, the electronic apparatus, the interrupt control method and the interrupt control program will be described with reference to the drawings.

The processor, the electronic apparatus and the interrupt control method in each of the following exemplary embodiments can be realized by means of a computer controlled by a program. The program is provided by a storing medium, for example. Examples of the storing medium include magnetic disks, optical disks, semiconductor memories, and other arbitral means which can be read by a computer.

The program which is stored in a storing medium can be directly read by a computer after mounting the storing medium on the computer, or can be read by a computer through a communication line.
[Processor]

The exemplary embodiment of the processor will be explained with reference to FIGS. 1 and 2.

Figure 1:
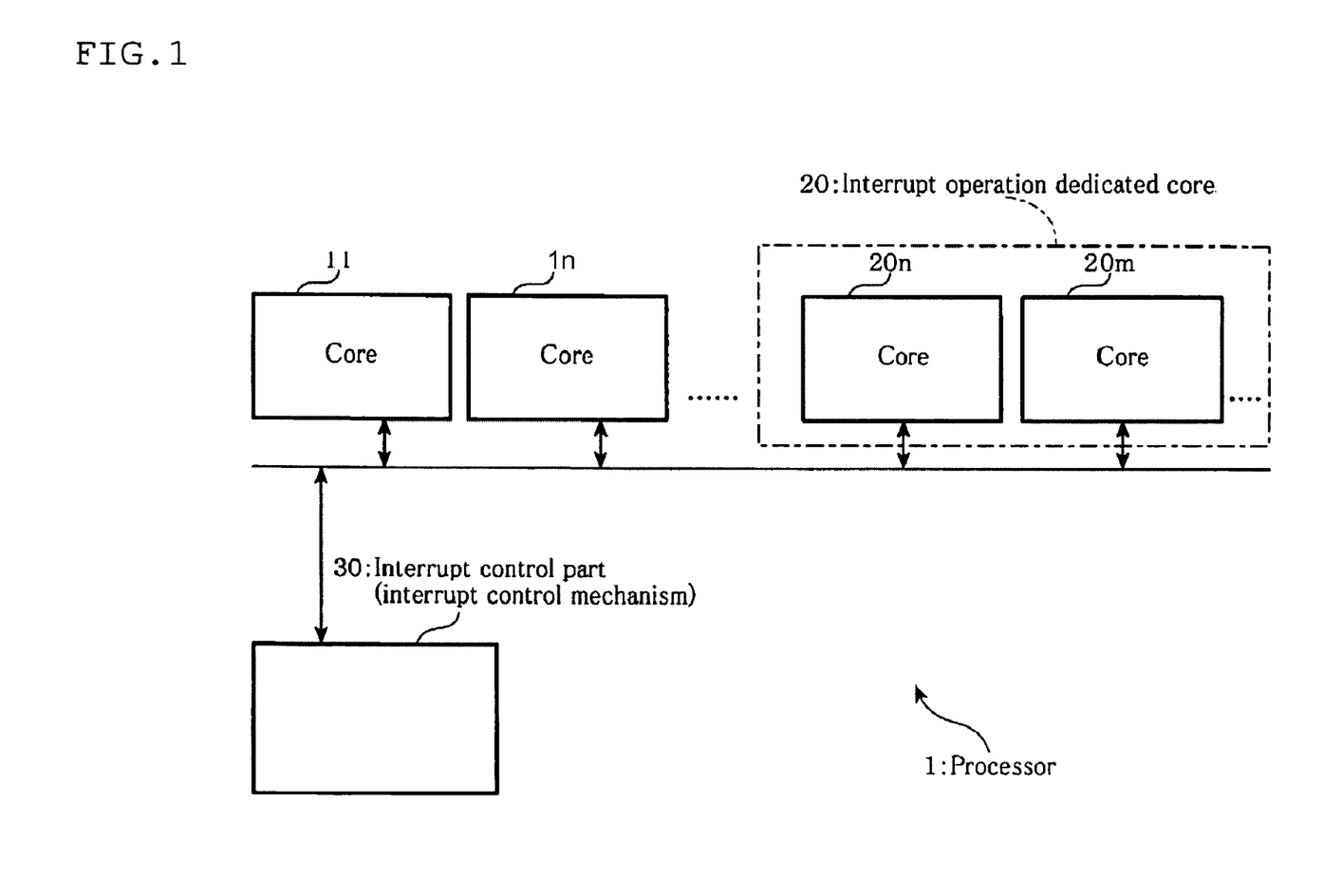
FIG. 1 is a block diagram showing the configuration of a processor in the exemplary embodiment of the invention.
Figure 2:
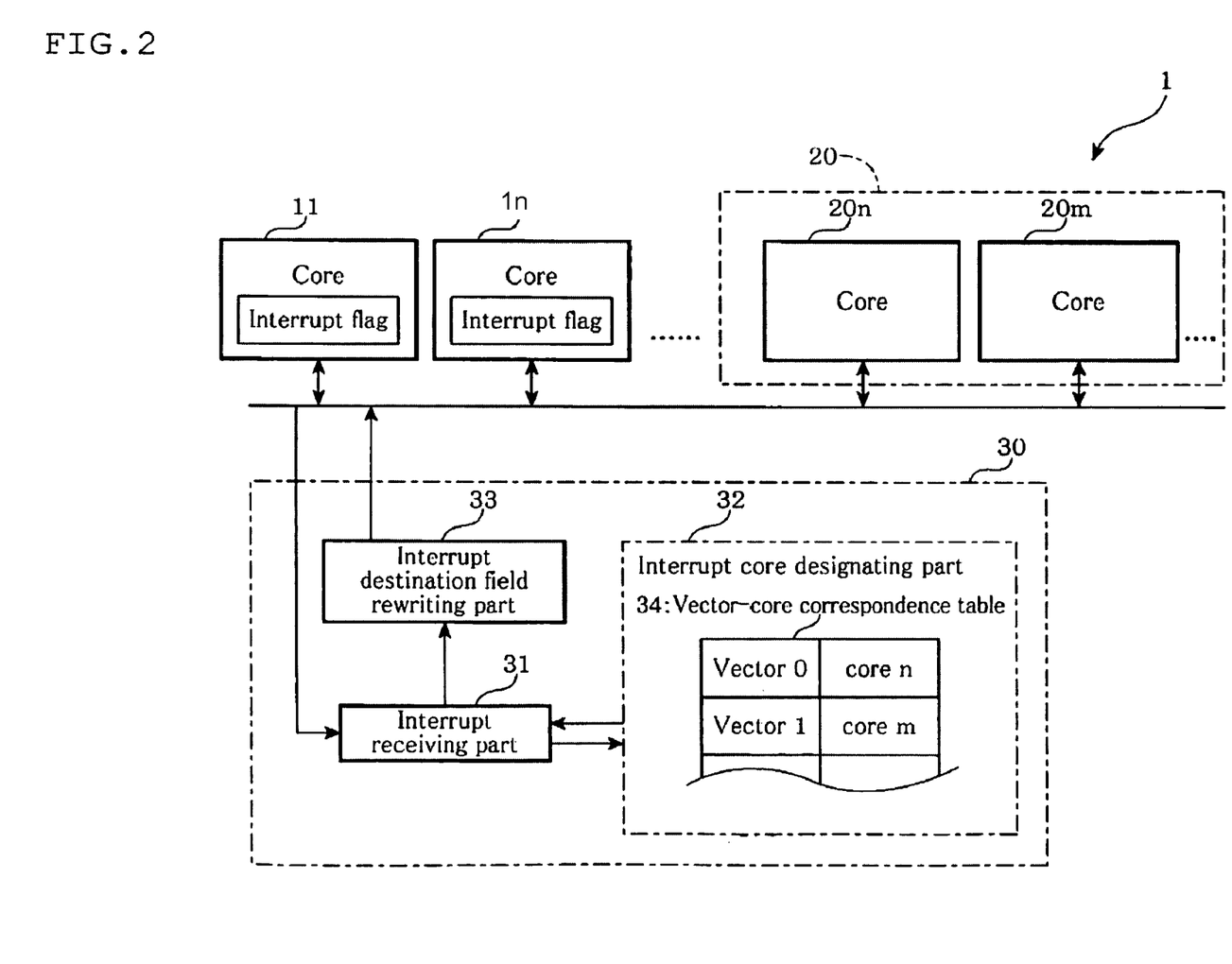
FIG. 2 is a block diagram showing a detailed configuration of the processor shown in FIG. 1.

FIG. 1 is a block diagram showing the configuration of the processor in this exemplary embodiment, and FIG. 2 is a block diagram showing the detailed configuration of the processor shown in FIG. 1.

As shown in FIG. 1, the processor 1 has cores 11 to 1$n$, interrupt operation dedicated cores 20 (20$n$, 20$m$, . . . ) and an interrupt control part (interrupt control mechanism, interrupt control core) 30.

The cores (normal cores, CPU) 11 to in are general cores mounted on the processor 1. These cores 11 to in turn an interrupt flag ON (set) upon receipt of an interrupt request from a peripheral apparatus (or an interrupt controller). Then, the interrupt flag is turned OFF (reset) when a flag-OFF instruction is received from the interrupt control part 30.

Although the number of the cores (the cores 11 to 1$n$) is two in FIGS. 1 and 2, the number of the core is not limited to two. One core or three or more cores may be provided.

The interrupt operation dedicated core 20 executes an interrupt handler when an interrupt operation is assigned by the interrupt control part 30. That is, the interrupt operation dedicated core 20 is used only when an interrupt is executed, and does not work unless an interrupt request is issued.

This interrupt operation dedicated core 20 is a core which cannot be seen by an OS. In other words, it is a core which is not recognized by an OS, or a core which is shielded from an OS. Shielding the core from an OS can be realized by a known technology such as control by firmware.

Although the number of the interrupt operation dedicated cores 20 is two (20$n$, 20$m$) in FIGS. 1 and 2, the number of the interrupt operation dedicated core 20 is not limited to two. One core or three or more interrupt operation dedicated cores may be provided.

The interrupt control part 30 can be configured by using cores. As shown in FIG. 2, the interrupt control part 30 is provided with an interrupt receiving part (interrupt receiving mechanism, interrupt receiving means) 31, an interrupt core designating part (interrupt core designating mechanism) 32 and an interrupt destination rewriting part (interrupt destination field rewriting mechanism, interrupt destination field rewriting means) 33.

The interrupt receiving part 31 serves to receive an interrupt operation when an interrupt flag in the cores 11 to 1$n$ is set, as well as to reset the interrupt flag by sending a flag-off instruction to the cores 11 to 1$n$.

Using an interrupt vector number as a key, the interrupt core designating part 32 stores a vector-core correspondence table 34 which correlates an interrupt vector number with the core number of the interrupt operation dedicated core 20.

The vector-core table 34 is a table which defines (designates) which interrupt operation dedicated core 20 is allowed to process a transaction according to each interrupt vector. For example, the interrupt vector number 0 is correlated with the interrupt operation dedicated core 20$n$, and the interrupt vector number 1 is correlated with the interrupt operation dedicated core 20$m$, respectively. In this way, as the core number defined in the core-vector correspondence table 34, a core number of the interrupt operation dedicated core 20 which is shielded from an OS is designated.

The interrupt core designation part 32 has a function as a "storing part (storing means)" since it stores the vector-core correspondence table 34.

Upon receipt of an interrupt request from the interrupt receiving part 31, the interrupt core designating part 32 obtains the interrupt vector contained in this interrupt request. Using this interrupt vector as a key, the interrupt core designating part 32 refers to the vector-core correspondence table 34, extracts the interrupt operation dedicated core 20 corresponding to the interrupt vector, and obtains this core number (retrieval of the interrupt core operation dedicated core 20). The interrupt operation dedicated core 20 becomes a core to which an operation by the interrupt vector is assigned.

As mentioned above, the interrupt core designating part 32 has a function as a "retrieval part" (retrieval means) since it retrieves the interrupt operation dedicated core 20 by referring to the vector-core correspondence table 34.

The interrupt destination field rewriting part 33 rewrites the interrupt designation field of an interrupt transaction and transmits the interrupt transaction in order to allow the interrupt operation to be performed by a specific core. For example, if the interrupt operation dedicated core 20$n$ is assigned by the interrupt core designating part 32, the interrupt designation field rewriting part 33 rewrites the interrupt designation field of the interrupt transaction to the core number of the interrupt operation dedicated core 20$n$, and transmits the interrupt transaction to the interrupt operation dedicated core 20$n$. As a result, the interrupt operation dedicated core 20$n$ can start a transaction.

Meanwhile, since the interrupt designation field rewriting part 33 transmits an interrupt transaction to the interrupt operation dedicated core 20$n$, it has a function as a "transmitting part (transmitting means)".
[Interrupt Control Method]

Next, the operation of the processor in this exemplary embodiment (interrupt control method) will be explained by referring to FIGS. 3 and 4.

Figure 3:
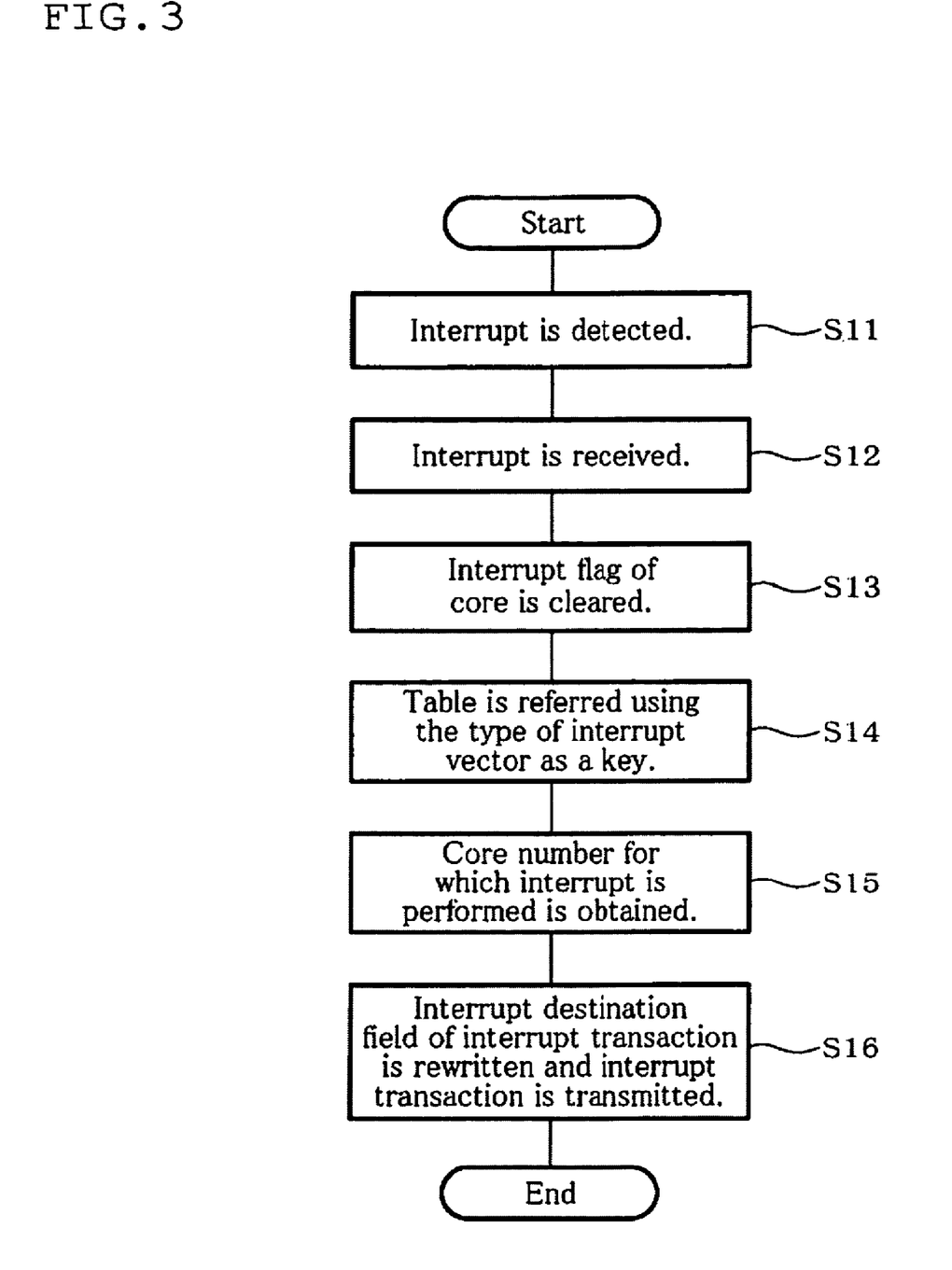
FIG. 3 is a flow chart showing the outline of the operation of the processor shown in FIG. 1.
Figure 4:
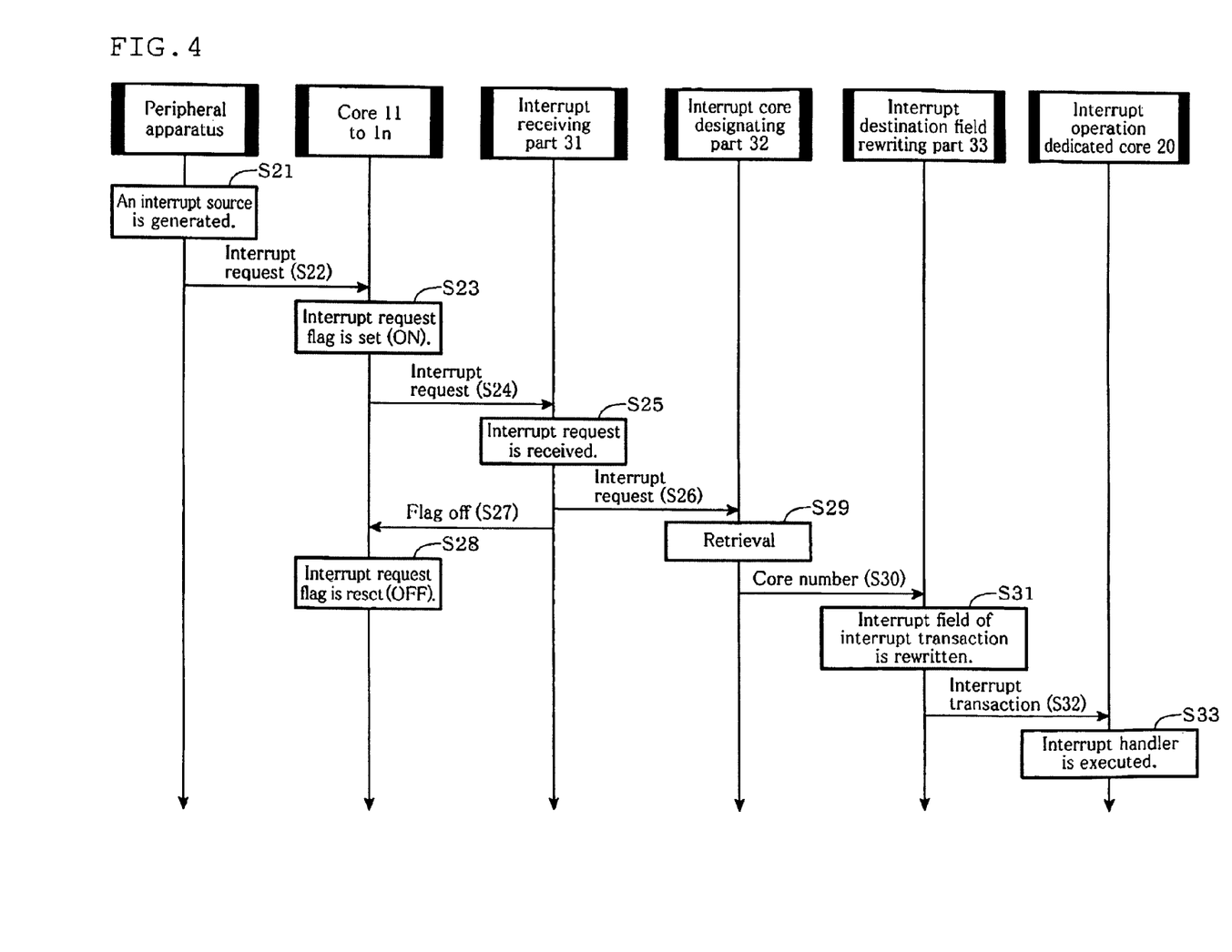
FIG. 4 is a diagram showing the operation in each part of the processor shown in FIG. 1.

FIG. 3 is a flow chart showing the outline of the operation in the interrupt control method in this exemplary embodiment. FIG. 4 shows the flow of operation in each part of the processor.

(Outline of Operation)

As shown in FIG. 3, the cores 11 to 1n set an interrupt request flag when an interrupt is detected based on the generation of an interrupt source in peripheral apparatuses (Step 11), and transmit an interrupt request to the interrupt control part 30.

The interrupt receiving part 31 of the interrupt control part 30 receives an interrupt request which has been sent from the cores 11 to 1n (Step 12), and sends a flag-off instruction to the cores 11 to 1n which has sent the interrupt request, thereby resetting the interrupt flag (clearance of the interrupt flag, Step 13).

The interrupt core designating part 32 refers to the vector-core correspondence table 34, specifies an interrupt operation dedicated core 20 corresponding to this interrupt vector by using an interrupt vector number (interrupt vector type) contained in an interrupt request signal as a key, and obtains the core number (retrieval (indexing)) (Steps 14 and 15).

The interrupt field destination rewriting part 33 rewrites the interrupt destination field of an interrupt transaction to the core number which has been obtained in the interrupt core designating part 32, and transmits the interrupt transaction to the interrupt operation dedicated core 20 indicated by this core number (Step 16).

The interrupt operation dedicated core 20 which receives the interrupt transaction from the interrupt field destination rewriting part 33 executes an interrupt handler.

By the procedure as mentioned above, the generated interrupt operation is assigned to the interrupt operation dedicated core 20 to allow the interrupt handler to be executed.

(Details of the Operation)

Next, the flow of the operation in each part of the processor will be explained with reference to FIG. 4.

The peripheral apparatus sends an interrupt request to the cores 11 to 1n (Step 22) when an interrupt source is generated (Step 21).

Upon receipt of the interrupt request, the cores 11 to 1n set an interrupt request flag (detection of an interrupt, Step 23), and send the interrupt request to the control part 30 (Step 24).

Upon receipt of the interrupt request which has been sent from the cores 11 to 1n (Step 25), the interrupt receiving part 31 of the interrupt control part 30 sends this interrupt request to the interrupt core designating part 32 (Step 26).

In addition, upon receipt of the interrupt request, the interrupt receiving part 31 also sends a flag-off instruction to the cores 11 to 1n which has sent this interrupt request, thereby resetting the interrupt flag (Steps 27, 28).

As mentioned above, by resetting the flag, the cores 11 to 1n, in which an interrupt is generated, judges that no interrupt is generated, and the on-going operation can be performed without suspension. As a result, the operation can be performed at an increased speed.

The interrupt core designating part 32 refers to the vector-core correspondence table 34, specifies an interrupt operation dedicated core 20 corresponding to this interrupt vector by using an interrupt vector number contained in an interrupt request signal as a key, and extracts this core number (retrieval (indexing), Step 29). The thus extracted core number is sent to the interrupt destination field rewriting part 33 (Step 30).

The interrupt destination field rewriting part 33 rewrites the interrupt destination field of the interrupt transaction to the core number which has been extracted by the interrupt core designating part 32 (Step 31), and transmits this interrupt transaction to the interrupt operation dedicated core 20 indicated by this core number (Step 32).

As mentioned above, by rewriting the interrupt destination field, it is possible to change the core which processes the transaction.

The interrupt operation dedicated core 20 which receives the interrupt transaction from the interrupt destination field rewriting part 33 then executes an interrupt handler (Step 33).

By the procedures as mentioned above, the interrupt operation generated for the cores 11 to 1n can be assigned to the interrupt operation dedicated core 20.

[Electronic Apparatus]

The electronic apparatus in this exemplary embodiment means an apparatus or a device in which a processor is mounted.

Specific examples of the electronic apparatus include personal computers, home electronic appliances, AV (Audio Visual) apparatuses, OA (Office Automation) apparatuses, communication apparatuses (including mobile phones or the like), watches and game machines, in each of which a processor is mounted. Also, the electronic apparatus in this exemplary embodiment includes processor-mounted apparatuses or devices used in various control systems. Specific examples include control systems of traffic means such as automobiles, railway vehicles, ships and airplanes, control systems of a system controlling the traffic network such as an ATM (Automated Teller Machine) system, a road and traffic system and a control tower system, and control systems of electric power facilities such as power generating facilities, power transmitting and distribution facilities and power receiving facilities.

As mentioned above, according to the processor, the electronic apparatus, the interrupt control method and the interrupt control program in this exemplary embodiment, if an interrupt operation is generated, a transaction is assigned to the interrupt operation dedicated core, not to a core which is executing an operation. As a result, this normal operation is not required to be suspended, whereby operation can be performed at an increased speed.

In addition, since the cache data for the normal operation is not required to be rewritten, operation can be performed at an increased speed due to the effective use of the cache data.

Furthermore, since the assignment of the interrupt operations is performed by the interrupt control core, not by an OS, an interrupt can be performed at an increased speed in conformity of actual circumstances.

Exemplary embodiments of the processor, the electronic apparatus, the interrupt control method and the interrupt control program are explained hereinabove. However, the exemplary embodiments of the processor, the electronic apparatus, the interrupt control method and the interrupt control program of the invention are not limited to those mentioned in the above exemplary embodiment. It is needless to say various modifications can be made within the scope of the invention.

For example, in the above-mentioned exemplary embodiment, the explanation was made for a hardware interrupt in which an interrupt source is generated in peripheral apparatuses. However, the invention is not limited to a hardware interrupt, and the invention can be also applied to a software interrupt.

In addition, in the above-mentioned exemplary embodiment, one processor is provided with the cores 11 to 1n and the interrupt operation dedicated core 20. The invention, however, is not limited to this configuration. A configuration in which one processor is provided with the cores 11 to 1n and the other processor is provided with the interrupt operation dedicated core 20 is possible.

Furthermore, the interrupt control part may be mounted in a processor different from a processor in which the cores 11 to 1n and the interrupt operation dedicated core 20 are mounted.

INDUSTRIAL APPLICABILITY

Since the invention relates to an interrupt in a processor, it can be applied to apparatuses or devices in which a processor is mounted.

The invention claimed is:

1. A processor provided with a plurality of cores, which comprises:
   an interrupt operation dedicated core which is used only for an interrupt operation;
   a normal core which outputs an interrupt request when an interrupt source is generated; and
   an interrupt control part which, upon receipt of the interrupt request, assigns an operation by an interrupt vector to the interrupt operation dedicated core,
   wherein the interrupt control part comprises:
      an interrupt receiving part which receives the interrupt request;
      a storing part which stores a table correlating an interrupt vector and the interrupt operation dedicated core;
      a retrieving part which refers to the table and retrieves an interrupt operation dedicated core corresponding to an interrupt vector contained in the interrupt request;
      a transmission part which sends an interrupt transaction to an interrupt operation dedicated core selected by the retrieving; and
      an interrupt destination field rewriting part which rewrites an interrupt destination field of the interrupt transaction to a core number indicating the interrupt operation dedicated core selected by the retrieving part, and the transmission part transmits the interrupt transaction to the interrupt operation dedicated core, and
   wherein, in the table, all of the cores correlated with the interrupt vector are the interrupt operation dedicated cores.

2. The processor according to claim 1, wherein the interrupt operation dedicated core is a core which cannot be recognized by an operating system.

3. The processor according to claim 1, which is provided with a plurality of the interrupt operation dedicated cores, wherein the interrupt control part, upon receipt of the interrupt request, selects a core corresponding to an interrupt vector contained in the interrupt request from the plurality of interrupt operation dedicated cores, and assigns an operation by the interrupt vector to the selected core.

4. An electronic apparatus provided with one or two or more processors, wherein the processor comprises:
   an interrupt operation dedicated core which is used only for an interrupt operation;
   a normal core which outputs an interrupt request when an interrupt source is generated; and
   an interrupt control part which, upon receipt of the interrupt request, assigns an operation by an interrupt vector to the interrupt operation dedicated core,
   wherein the interrupt control part comprises:
      an interrupt receiving part which receives the interrupt request;
      a storing part which stores a table correlating an interrupt vector and the interrupt operation dedicated core;
      a retrieving part which refers to the table and retrieves an interrupt operation dedicated core corresponding to an interrupt vector contained in the interrupt request;
      a transmission part which transmits an interrupt transaction to an interrupt operation dedicated core selected by the retrieving; and
      an interrupt destination field rewriting part which rewrites an interrupt destination field of the interrupt transaction to a core number indicating the interrupt operation dedicated core selected by the retrieving part, and the transmission part transmits the interrupt transaction to the interrupt operation dedicated core, and
   wherein, in the table, all of the cores correlated with the interrupt vector are the interrupt operation dedicated cores.

5. The electronic apparatus according to claim 4, wherein the interrupt operation dedicated core is a core which is not recognized by an operating system.

6. The electronic apparatus according to claim 4, wherein the processor is provided with a plurality of the interrupt operation dedicated cores, wherein the interrupt control part, upon receipt of the interrupt request, selects a core corresponding to an interrupt vector contained in the interrupt request from the plurality of interrupt operation dedicate cores, and assigns an operation by the interrupt vector to the selected core.

7. An interrupt control method which comprises:
   receiving an interrupt request; and
   assigning an operation by a processor to an interrupt operation dedicated core which is used only for an interrupt operation, by:
      storing a table correlating an interrupt vector and the interrupt operation dedicated core;
      referring to the table and retrieving an interrupt operation dedicated core corresponding to an interrupt vector contained in the interrupt request;
      transmitting an interrupt transaction to an interrupt operation dedicated core selected; and
      rewriting an interrupt destination field of the interrupt transaction to a core number indicating the interrupt operation dedicated core selected, and
      transmitting the interrupt transaction to the interrupt operation dedicated core,
   wherein, in the table, all of the cores correlated with the interrupt vector are the interrupt operation dedicated cores.

8. A non-transitory computer-readable storage medium storing an interrupt control program, wherein execution of said program by a processor results in performance of a method comprising:
   receiving an interrupt request;
   assigning an operation by a processor to an interrupt operation dedicated core which is used only for an interrupt operation, by:
      storing a table correlating an interrupt vector and the interrupt operation dedicated core;
      referring to the table and retrieving an interrupt operation dedicated core corresponding to an interrupt vector contained in the interrupt request;
      transmitting an interrupt transaction to an interrupt operation dedicated core selected; and
      rewriting an interrupt destination field of the interrupt transaction to a core number indicating the interrupt operation dedicated core selected, and transmitting the interrupt transaction to the interrupt operation dedicated core, wherein, in the table, all of the cores correlated with the interrupt vector are the interrupt operation dedicated cores.

9. A processor which comprises:

an interrupt operation dedicated means which is used only for an interrupt operation;

an interrupt request outputting means which outputs an interrupt request when an interrupt source is generated; and an interrupt control means which, upon receipt of the interrupt request, assigns an operation by an interrupt vector to the interrupt operation dedicated means, wherein the interrupt control means comprises:
- an interrupt receiving part which receives the interrupt request;
- a storing part which stores a table correlating an interrupt vector and the interrupt operation dedicated core;
- a retrieving part which refers to the table and retrieves an interrupt operation dedicated core corresponding to an interrupt vector contained in the interrupt request;
- a transmission part which transmits an interrupt transaction to an interrupt operation dedicated core selected by the retrieving; and
- an interrupt destination field rewriting part which rewrites an interrupt destination field of the interrupt transaction to a core number indicating the interrupt operation dedicated core selected by the retrieving part, and the transmission part transmits the interrupt transaction to the interrupt operation dedicated core, and wherein, in the table, all of the cores correlated with the interrupt vector are the interrupt operation dedicated cores.

10. An electronic apparatus provided with one or two or more processors, wherein the processor comprises:

an interrupt operation dedicated means which is used only for an interrupt operation;

an interrupt request outputting means which outputs an interrupt request when an interrupt source is generated; and an interrupt control means which, upon receipt of the interrupt request, assigns an operation by an interrupt vector to the interrupt operation dedicated means, wherein the interrupt control part comprises:
- an interrupt receiving part which receives the interrupt request;
- a storing part which stores a table correlating an interrupt vector and the interrupt operation dedicated core;
- a retrieving part which refers to the table and retrieves an interrupt operation dedicated core corresponding to an interrupt vector contained in the interrupt request;
- a transmission part which transmits an interrupt transaction to an interrupt operation dedicated core selected by the retrieving; and
- an interrupt destination field rewriting part which rewrites an interrupt destination field of the interrupt transaction to a core number indicating the interrupt operation dedicated core selected by the retrieving part, and the transmission part transmits the interrupt transaction to the interrupt operation dedicated core, and wherein, in the table, all of the cores correlated with the interrupt vector are the interrupt operation dedicated cores.

* * * * *